July 14, 1964
F. L. GRIFFITH ETAL
3,140,795
LID RETAINER
Filed July 29, 1963
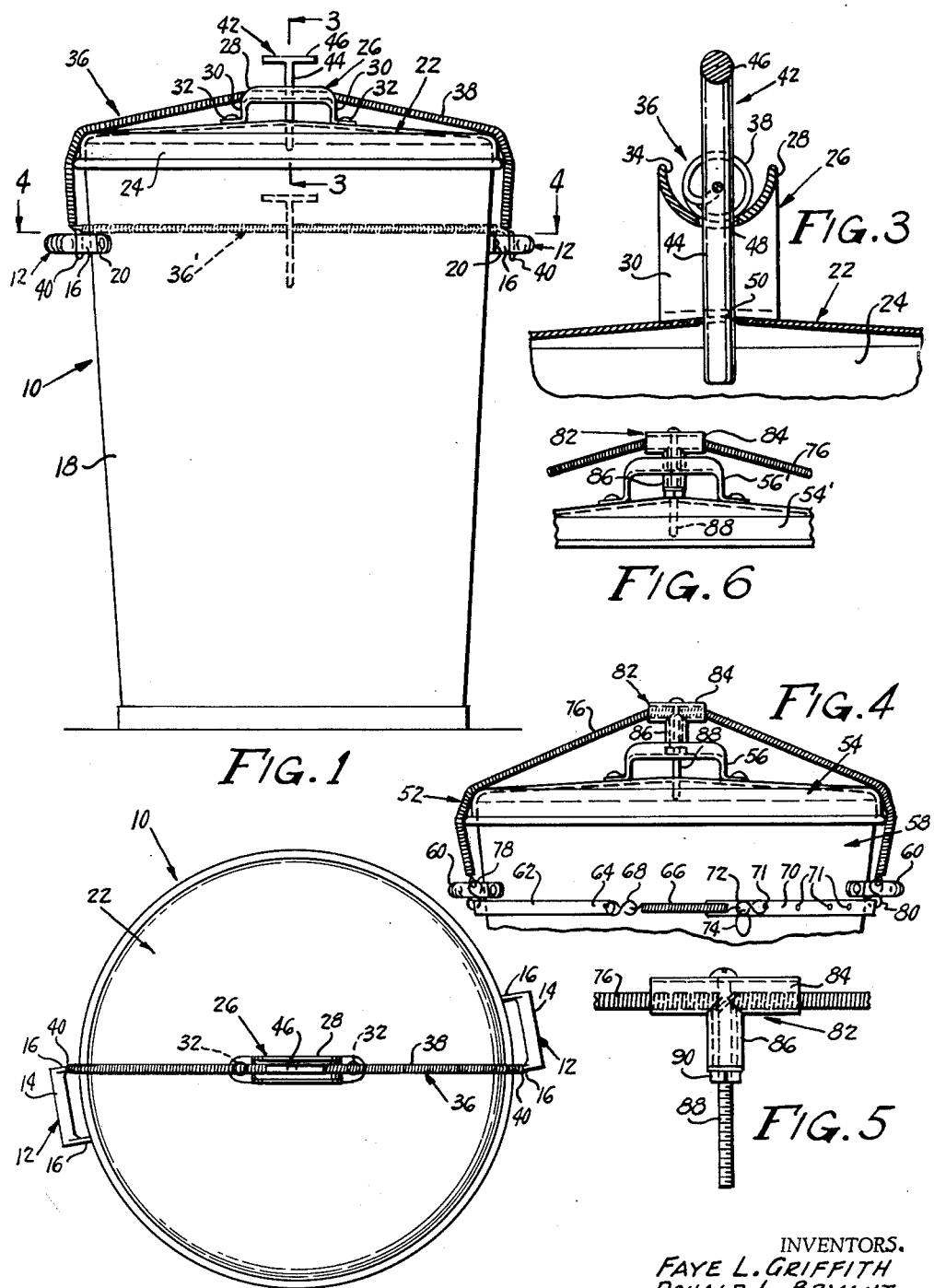
INVENTORS.
FAYE L. GRIFFITH
DONALD L. BRYANT
BY
Kimmel & Crowell
ATTORNEYS.

ates Patent Office 3,140,795
Patented July 14, 1964

3,140,795
LID RETAINER
Faye L. Griffith, 325 P. G. Sweet Road, Kelso, Wash.,
and Donald L. Bryant, 3314 Laurel Road, Longview,
Wash.
Filed July 29, 1963, Ser. No. 298,024
7 Claims. (Cl. 220—55.7)

This invention relates to a lid retainer and more particularly to a device for retaining the lids on containers such as garbage cans, trash cans, and the like.

A primary object of the instant invention is to provide a means for retaining the lid on a container to prevent animals, children or the like from removing the same and scattering the contents about the premises.

Another object of this invention is the provision of a device of the type described utilizing a tensioned coiled spring to secure the lid on the container.

A further object of the instant invention is to provide a lid reetainer which is secured to the container itself to preclude loss of the retainer device when not in use.

A further object of this invention is to provide a lid retainer which is adjustable to be readily attached to trash or garbage cans of various dimensions.

Still another object of the instant invention is the provision of a lid retainer having locking means engageable with portions of the lid for the prevention of accidental disengagement.

A still further object of this invention is to provide such a structure wherein grip means are connected thereto to facilitate disengaging the retaining element to permit the lid to be removed from the container.

Other and further objects reside in the combination of elements, arrangement of parts, and features of construction.

Still other objects will in part be obvious and in part be pointed out as the description of the invention proceeds and as shown in the accompanying drawing wherein:

FIGURE 1 is a side elevational view of a standard garbage or trash can with the lid thereof retained in place by one embodiment of the device of the instant invention, the inoperative position of the lid retainer being shown in dotted lines;

FIGURE 2 is a top plan view thereof;

FIGURE 3 is an enlarged fragmentary cross-sectional view taken substantially on line 3—3 of FIGURE 1;

FIGURE 4 is a fragmentary side elevational view of a lid being retained on a can by a modified embodiment of the device of the instant invention;

FIGURE 5 is an enlarged fragmentary view of the T-shaped handle of the embodiment of FIGURE 4; and FIGURE 6 is a fragmentary side elevational view of a still further modified construction of lid retainer.

Similar reference characters refer to similar parts throughout the several views of the drawing.

Referring now to the drawing and more particularly to FIGURES 1–3, a conventional container such as a garbage or trash can is designated generally by the reference numeral 10 and includes a pair of oppositely disposed, outwardly extending, handle members 12, each having grip portions 14 and connector portions 16, the latter being secured to the side wall 18 of the container 10 by any conventional means 20. The container 10 has a closed lower end and an opened upper end, with a lid 22 removably receivable over the upper end of the container 10 in closing relationship in a well known manner as shown in FIGURES 1 and 2. The lid 22 conventionally has a downwardly depending peripheral flange portion 24 and a lid handle 26 including a grip portion 28 and a pair of connector portions 30 secured to the lid 22 by any conventional means 32. The grip portion 28 preferably defines an upwardly opening U-shaped trough 34 as best seen in FIGURE 3 for a purpose to be described further hereinafter.

One embodiment of the lid retainer of the instant invention is designated generally by the reference numeral 36 and is comprised basically of a flexible and extensible retaining element 38 preferably in the form of a coil spring having its end portions 40 secured to substantially diametrically opposed portions of the container 10, preferably to the handle members 12. As shown in the drawing, the end portions 40 of the coil spring 38 are secured to opposite connector portions 16 of the handle members 12, this being the preferable construction. However, it is to be understood that any similar connection of the end portions 40 may be adopted, the connection being merely to preclude accidental loss of the lid retainer 36 when inoperative as will be disclosed in more detail hereinafter.

A T-shaped handle 42 having a vertically extending rod member 44 with a horizontally extending cross bar 46 secured to one end thereof is provided with the coil spring 38 being connected to the vertically extending rod member 44 intermediate its ends in any conventional manner as by passing the spring 38 through an aperture in rod member 44. Note particularly FIGURE 3.

Vertically aligned apertures 48 and 50 are defined in the grip portion 28 of the lid handle 26 and in the lid 22, respectively, and are adapted to receive the lower portion of the vertically extending rod member 44 for a purpose and in a manner to be described hereinafter.

The use and operation of the above-described embodiment of lid retainer in accordance with the instant invention will now be apparent. The coil spring 38 is engageable over the lid 22 and the lid handle 26, preferably within the U-shaped trough 34 as shown in the drawing, by grasping the cross bar 46 of the T-shaped handle 42 which acts as a grip means and stretching the coil spring 38 with the lid 22 in closing relationship to the container 10. The lower portion of the vertically extending rod member 44 of the T-shaped handle 42 functions as a locking means and engages in the vertically aligned apertures 48 and 50 to preclude accidental displacement or disengagement of the lid retainer 36 during use. When it is desired to remove the lid 22 for any purpose, the cross bar 46 is again grasped and the lower end of the vertically extending rod member 44 is withdrawn from the apertures 48 and 50, the coil spring 38 being pulled to one side of the container 10 and contracting to closely engage the same thereby being out of the way when not in use as shown in dotted lines at 36′ in FIGURE 1.

Referring now particularly to FIGURES 4 and 5, a modified lid retainer is designated by the reference number 52 as securing a lid 54 having a lid handle 56 to a container 58 having oppositely disposed handle members 60. The lid retainer 52 includes a flat band 62 of metal or the like adapted to circumscribe the container 58 preferably below the handle members 60. One end portion 64 of the band 62 has a short spring 66 secured thereto in any conventional manner as by S-shaped hook 68. The other end portion 70 of the band 62 has a plurality of spaced apertures 71 defined therethrough adapted to selectively receive S-shaped hook 72 on the other end of short spring 66, a pull ring 74 also being secured to this end of the short spring 66 to facilitate expanding the same for engaging the hook 72 in an obvious manner. A long spring 76 similar to retaining element 38 is secured to band 62 as by S-shaped hook 78 and an S-shaped hook 80 on the opposite end of spring 76 is adapted to be selectively received in one of the apertures 71. A T-shaped hollow handle 82 formed of plastic or the like either integrally or in separate horizontally and vertically extending members 84 and 86, respectively, includes an elongated bolt member 88 secured perpendicularly through the center of the horizontal member 84 and longitudinally through the vertical member 86 by nut 90. Note particularly FIGURE 5. The long spring 76 passes through the horizontal member 84 and one of its coils is spread to receive the bolt 88.

Vertically aligned apertures (not shown) similar to apertures 48 and 50 in the embodiment of FIGURES 1–3, are defined through the lid handle 56 and the lid 54 respectively.

The aperture in the lid handle 56 may be dimensioned to only receive the bolt 88 as seen in FIGURE 4, with the vertical member 86 spacing the horizontal member 84 to facilitate gripping the T-shaped handle 82 for disengagement.

Alternately, the aperture in the lid handle 56' may be dimensioned to receive the vertical member 86, but the aperture in the lid 54' may only receive the bolt 88 as shown in FIGURE 6.

If desired, both apertures may be dimensioned to receive the vertical member 86 (not shown) to allow the horizontal member 84 to rest in the trough formed by the lid handle relying on gripping the long spring 76 at a point along its length spaced from either the lid or the container for disengaging the lid retainer.

The use and operation of the embodiments of FIGURES 4–6 will be obvious from the above description. The T-shaped handle 82 may be disengaged and the lid retainer 52 readily moved to an inoperative position similar to 36' shown in FIGURE 1. The band 62 may be really adjusted for reception of containers of different dimensions by gripping the pull ring 74 and stretching the short spring 66 until the hook 72 can be engaged in a desired aperture 71.

It will now be seen that there is herein provided an improved lid retainer for containers such as garbage cans, trash cans, or the like which satisfies all of the objectives of the instant invention and others, including many advantages of great practical utility and commercial importance.

Since many embodiments may be made of the instant inventive concept and since many modifications may be made of the embodiments hereinbefore shown and described, it is to be understood that all matter herein is to be interpreted merely as illustrative, and not in a limiting sense.

We claim:
1. In combination, a container having an open upper end, a lid removably receivable over said upper end of said container in closing relationship, said lid having a lid handle secured substantially centrally thereto and including a grip portion, a flexible and expansible retaining element having end portions secured adjacent diametrically opposed portions of said container, said retaining element being engageable over said lid and said lid handle when said lid is received in closing relationship and being normally biased to retain said lid in said relationship, locking means connected to said retaining element to maintain said retaining element in engagement with said lid and said lid handle, grip means connected to said locking means to facilitate disengaging said retaining element to permit said lid to be removed, vertically aligned apertures defined in said lid and said grip portion of said lid handle, a T-shaped handle having a vertically extending member with two ends and a horizontally extending cross bar secured to one of said ends, said retaining element being connected to said vertically extending member intermediate said ends, the portion of said vertically extending member below said retaining member being engageable in said apertures and defining said locking means, and said cross bar defining said grip means.

2. In combination, a container having an open upper end, a lid removably receivable over said upper end of said container in closing relationship, said lid having a lid handle secured substantially centrally thereto and including a grip portion, a flexible and expansible retaining element having end portions secured adjacent diametrically opposed portions of said container, said retaining element being engageable over said lid and said lid handle when said lid is received in closing relationship and being normally biased to retain said lid in said relationship, locking means connected to said retaining element to maintain said retaining element in engagement with said lid and said lid handle, grip means connected to said locking means to facilitate disengaging said retaining element to permit said lid to be removed, vertically aligned apertures defined in said lid and said grip portion of said lid handle, a hollow T-shaped handle having a vertically extending member with two ends and a horizontally extending cross bar secured to one of said ends, and a bolt secured perpendicularly to said cross bar and longitudinally through said vertically extending member, said bolt extending beyond the other end of said vertically extending member and being of less cross-section than said vertically extending member.

3. A structure in accordance with claim 2 wherein said retaining member extends longitudinally through said cross bar.

4. A structure in accordance with claim 2 wherein said aperture in said grip portion of said lid handle is larger than the cross-section of said bolt and smaller than the cross-section of said vertically extending member, said bolt extending beyond said vertically extending member sufficiently to engage in said aperture in said lid.

5. A structure in accordance with claim 2 wherein said aperture in said lid handle is larger than the cross-section of said vertically extending member.

6. The structure of claim 5 wherein said aligned aperture in said lid is larger than the cross-section of said bolt and smaller than the cross-section of said vertically extending member and said vertically extending member is of sufficient dimension to support said cross bar in spaced relationship above said grip portion of said lid handle.

7. The structure of claim 5 wherein said aligned aperture in said lid is larger than the cross-section of said vertically extending member.

References Cited in the file of this patent
UNITED STATES PATENTS

| | | |
|---|---|---|
| 824,507 | Robinson | June 26, 1906 |
| 2,768,851 | Gifford | Oct. 30, 1956 |
| 2,984,511 | Hedrick | May 16, 1961 |